(12) United States Patent
Malchow et al.

(10) Patent No.: US 11,108,346 B2
(45) Date of Patent: Aug. 31, 2021

(54) METHOD AND DEVICE FOR DETECTING POSITION ERRORS OF A ROTOR OF AN ELECTRONICALLY COMMUTATED ACTUATOR DRIVE

(71) Applicant: Robert Bosch GmbH, Stuttgart (DE)

(72) Inventors: Florian Malchow, Stuttgart (DE); Udo Sieber, Bietigheim (DE); Dieter Schwarzmann, Heilbronn (DE); Tobias Mauk, Stuttgart (DE); Andreas Ortseifen, Eschweiler (DE)

(73) Assignee: Robert Bosch GmbH, Stuttgart (DE)

( * ) Notice: Subject to any disclaimer, the term of this patent is extended or adjusted under 35 U.S.C. 154(b) by 805 days.

(21) Appl. No.: 15/021,549

(22) PCT Filed: Aug. 5, 2014

(86) PCT No.: PCT/EP2014/066789
§ 371 (c)(1),
(2) Date: Mar. 11, 2016

(87) PCT Pub. No.: WO2015/036179
PCT Pub. Date: Mar. 19, 2015

(65) Prior Publication Data
US 2016/0226412 A1 Aug. 4, 2016

(30) Foreign Application Priority Data
Sep. 16, 2013 (DE) ...................... 10 2013 218 472.7

(51) Int. Cl.
*H02P 3/12* (2006.01)
*H02P 29/032* (2016.01)
(Continued)

(52) U.S. Cl.
CPC ............... *H02P 6/16* (2013.01); *H02P 21/18* (2016.02)

(58) Field of Classification Search
CPC ............... H02P 6/28; H02P 21/12; B60L 3/12
See application file for complete search history.

(56) References Cited

U.S. PATENT DOCUMENTS

| 2014/0225548 A1* | 8/2014 | Xu | .......................... H02P 21/13 318/400.33 |
| 2015/0214875 A1* | 7/2015 | Matsui | ....................... H02P 6/15 318/400.13 |

FOREIGN PATENT DOCUMENTS

| CN | 1264212 A | 8/2000 |
| CN | 1719718 A | 1/2006 |

(Continued)

OTHER PUBLICATIONS

International Search Report corresponding to PCT Application No. PCT/EP2011/060475, dated Sep. 30, 2011 (German and English language document) (7 pages).

*Primary Examiner* — Kawing Chan
*Assistant Examiner* — Charles S Laughlin
(74) *Attorney, Agent, or Firm* — Maginot, Moore & Beck LLP

(57) ABSTRACT

The method for detecting a position error of an electronically commutated actuator drive between an assumed position and an actual position of the actuator drive includes performing a position control procedure for the position of the actuator drive. The method further includes providing data with regard to the assumed position of the actuator drive. The method further includes forming an electric space vector value to generate a component of a stator magnetic field that extends parallel with a direction of an exciter magnetic field that prevails in the case of the assumed position of the actuator drive. The method further includes detecting whether a movement of the actuator drive has occurred as a result of generating the component of the exciter magnetic field.

26 Claims, 3 Drawing Sheets

(51) Int. Cl.
*H02P 6/16* (2016.01)
*H02P 21/18* (2016.01)

(56) References Cited

FOREIGN PATENT DOCUMENTS

| | | |
|---|---|---|
| CN | 102332856 A | 1/2012 |
| CN | 103069709 A | 4/2013 |
| DE | 10 2010 063 326 | 12/2011 |
| DE | 10 2011 005 566 | 9/2012 |
| DE | 10 2011 005 774 | 9/2012 |
| JP | 10-94299 A | 4/1998 |
| JP | 2011-200105 A | 10/2011 |
| WO | 2012/116849 A1 | 9/2012 |

\* cited by examiner

METHOD AND DEVICE FOR DETECTING POSITION ERRORS OF A ROTOR OF AN ELECTRONICALLY COMMUTATED ACTUATOR DRIVE

Method and device for detecting position errors of a rotor of an electronically commutated actuator drive This application is a 35 U.S.C. § 371 National Stage Application of PCT/EP2014/066789, filed on Aug. 5, 2014, which claims the benefit of priority to Serial No. DE 10 2013 218 472.7, filed on Sep. 16, 2013 in Germany, the disclosures of which are incorporated herein by reference in their entirety.

The disclosure relates to actuator drives, in particular actuator drives that are embodied as electronically commutated electric motors. Furthermore, the present disclosure relates to measures for detecting and correcting position errors when positioning a rotor of the actuator drive.

BACKGROUND

It is also possible to use electronically commutated actuator drives in lieu of brush-commutated electric motors for positioning applications. In contrast to brush-commutated actuator drives, electronically commutated actuator drives need to know the position of the rotor in order to perform the control procedure in a precise manner. The control procedure of electronically commutated actuator drives reacts in a very sensitive manner to parameter fluctuations and errors when ascertaining the rotor position. It is possible for this purpose to arrange a position sensor on the rotor or the rotor position can be detected with the aid of current-based position-ascertaining methods.

By way of example, a restrictor flap positioner can be equipped with an electronically commutated actuator drive in order as an actuator to be able to adjust the position of a restrictor flap. In so doing, it is possible for cost reasons and for reasons relating to reliability to forego the provision of a sensor for directly ascertaining the rotor position or for ascertaining a motor current. In lieu thereof, the rotor position is ascertained indirectly by means of an angle sensor that is arranged on the restrictor flap so as to detect the angle position of the restrictor flap. Since the restrictor flap is connected to the actuator drive by way of a reduction gear, it is not possible using such an arrangement to ascertain rotor positions in a very precise manner and the resultant uncertainties are by way of example 15°. Furthermore, it is necessary to compensate for rotor position errors that occur as a result of thermal influences or influences resulting from aging.

As a result of the angle position of the restrictor flap not being allocated precisely to the position rotor of the actuator drive, it is necessary to perform an individual calibration, wherein by way of example a corresponding correction characteristic curve can be obtained. Methods previously proposed with regard to this provide for an additional intervention in the control procedure of the actuator drive, wherein an adjustment is made to the voltage vector that is to be adjusted and leads to a corresponding rotor position. As a result of this additional intervention, the rotor is moved by an error angle that must be subsequently compensated for by means of a possible position control procedure for the position of the rotor. As a consequence, there is the risk of a malfunction that can lead to instabilities in the position control procedure for the rotor position.

It is the object of the present disclosure to provide a method and a device with which in the case of an electronically commutated actuator drive it is possible to establish an error when ascertaining a rotor position. In particular, one object is to establish such a rotor position error in a manner that has the fewest possible effects on the operation of the positioner.

SUMMARY

This object is achieved by virtue of the method for detecting a position error of an electronically commutated actuator drive in accordance with claim 1 and also by virtue of the device, the positioning system and the computer program in accordance with the subordinate claims.

Further embodiments are disclosed in the dependent claims.

In accordance with a first aspect, a method is provided for detecting a position error of an electronically commutated actuator drive between an assumed position and an actual position of the actuator drive. The method includes the following steps:

- Perform a position control procedure for the position of the actuator drive;
- Provide data with regard to the assumed position of the actuator drive;
- Form an electric space vector value that generates a component of a stator magnetic field that extends parallel with a direction of an exciter magnetic field that prevails in the case of the assumed position of the actuator drive; and
- Detect whether a movement of the actuator drive has occurred as a result of generating the component of the exciter magnetic field.

One idea of the above method resides in performing the control procedure of the electronically commutated actuator drive in such a manner when the actuator drive is in a stationary state that the stator magnetic field that is generated extends parallel with the exciter magnetic field and has a direction that corresponds to the direction of the exciter magnetic field of the assumed position. Since the direction of the exciter magnetic field is fixedly coupled to the rotor position, a deviation of an actual rotor position from an assumed rotor position leads to a corresponding difference between the actual exciter magnetic field and the assumed exciter magnetic field. If the assumed rotor position corresponds to the actual rotor position, the generated stator magnetic field extends parallel with the exciter magnetic field and the additionally generated stator magnetic field does not cause any associated additional torque to be exerted on the rotor.

However, if the actual rotor position deviates from the assumed rotor position, a part of the additionally generated stator magnetic field thus extends at a right angle to the exciter magnetic field and an additional positioning torque is generated. This additional positioning torque can lead to a movement or adjustment of the rotor, as a consequence of which it is possible to detect an error when ascertaining the rotor position.

The above method for detecting an error of the rotor position has little effect on the function of the positioning system. In particular, if a rotor position error is not detected, an undesired movement of the actuator does not occur. However, if a rotor position error is detected, the intervention thus leads to a movement of the actuator that can be detected.

Furthermore, it is possible to provide that the additional stator magnetic field is generated in a controlled manner and a position control procedure of the actuator drive is not performed. As a consequence, the risk of destabilizing the positioning system is eliminated whilst simultaneously operating the control procedure and forming the voltage vector that generates the additional stator magnetic field. In particular, it is possible to provide that the controlled operation is performed only for a short period of time and in the case of a deactivated control procedure.

Furthermore, the component of the stator magnetic field can be generated in the case of a deactivated control procedure.

It is possible to provide that in the case of a movement of the actuator drive being detected the assumed position of the actuator drive is corrected.

In accordance with one embodiment, the assumed position of the actuator drive is corrected if the extent of a movement of the actuator drive exceeds a predetermined threshold value.

Moreover, the position control procedure can be activated after the assumed position of the actuator drive has been corrected.

In particular, the correction is performed in an iterative manner by means of incrementing or decrementing the assumed position.

In particular, the above method can be performed in an iterative manner until no further movement of the actuator drive is detected after the component of the stator magnetic field has been generated.

In accordance with one embodiment, the component of the stator magnetic field can be generated in accordance with a predetermined progression with respect to time, in particular in accordance with a ramp-shaped progression.

It can be provided that the position control procedure comprises an integrator part, wherein the integrator part is stopped as the position control procedure is deactivated.

In accordance with a further aspect, a device for detecting a position error of an electronically commutated actuator drive is provided between an assumed position and an actual position of the actuator drive, wherein the device is embodied so as to:
  Perform a position control procedure for the position of the actuator drive;
  Provide data with regard to the assumed position of the actuator drive;
  Generate a component of a stator magnetic field that extends parallel with a direction of the exciter magnetic field that prevails in the case of the assumed position of the actuator drive; and
  To detect whether a movement of the actuator drive has occurred as a result of generating the component of the stator magnetic field.

In accordance with a further aspect, a positioning system is provided comprising:
  An electronically commutated actuator drive;
  An actuator that is coupled to the actuator drive;
  A position detector for ascertaining a position of the actuator drive; and
  the above device.

BRIEF DESCRIPTION OF THE DRAWINGS

Preferred embodiments are further explained hereinunder with reference to the attached drawings, in which.

DETAILED DESCRIPTION

Figure 1:
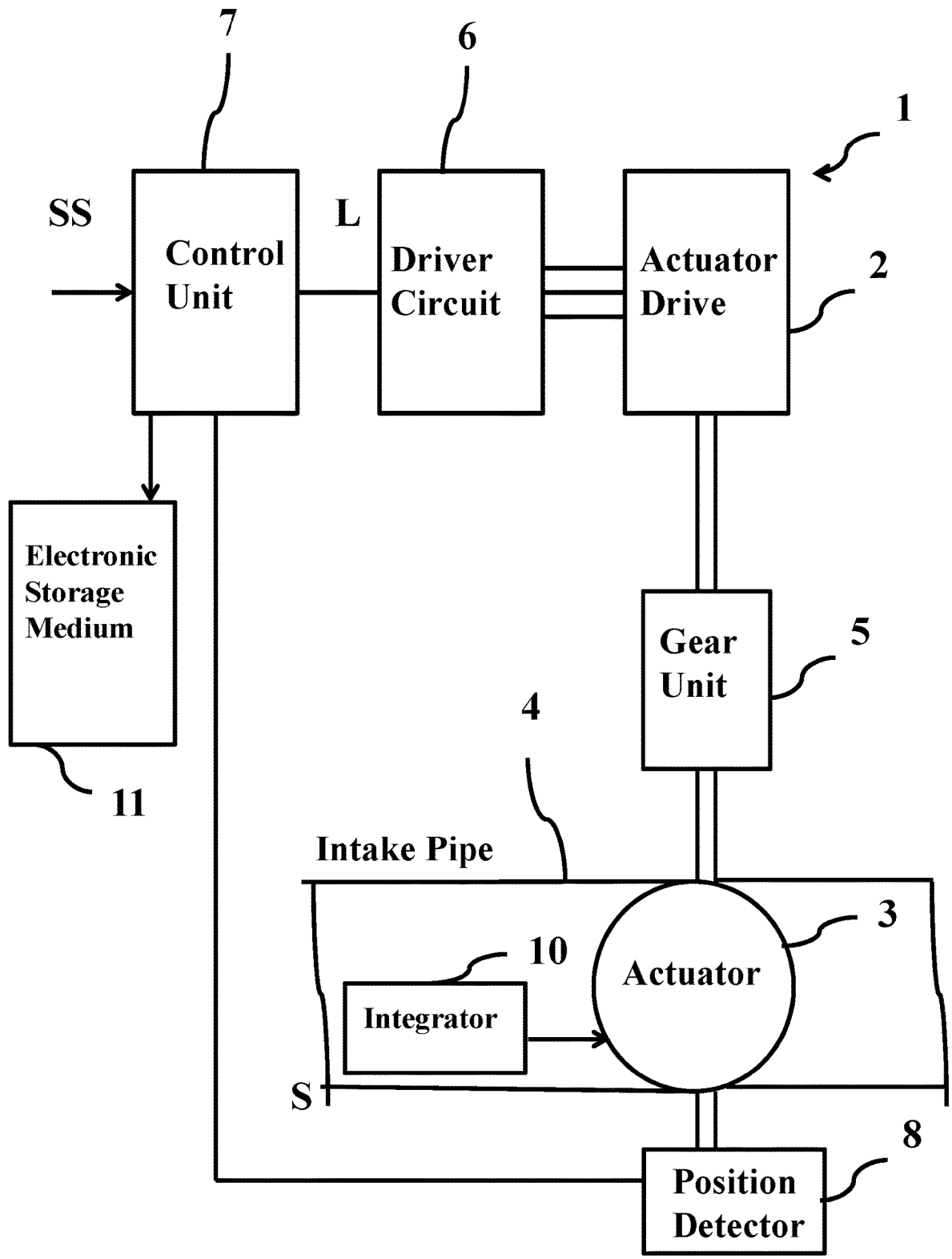
FIG. 1 illustrates a schematic view of a positioning system having an electronically commutated actuator drive.

FIG. 1 illustrates a schematic view of a positioning system 1, in particular of a restrictor flap positioner, for a fresh air intake system of a motor system having a combustion engine (not illustrated). The positioning system 1 comprises an actuator drive 2 that can be embodied as a rotary, electronically commutated electric motor. The actuator drive 2 is used to adjust an actuator that is embodied in the illustrated exemplary embodiment as a restrictor flap in an intake pipe 4.

The actuator 3 can be rotated, pivoted or adjusted in any other manner. In the case of a flap that is embodied as an actuator 3, any pivoting thereof varies an opening cross section in the intake pipe 4. In order to operate the actuator 3, the actuator drive 2 is coupled to said actuator by way of a gear unit 5 that comprises a transmission ratio. In the present exemplary embodiment, the flap is provided as an actuator 3 for a pivot movement in an angular range of approx. 90°. This pivot movement of the actuator 3 is achieved by virtue of a rotor (not illustrated) of the actuator drive 2 rotating a number of times. In other words, a rotation of the rotor of the actuator drive 2 produces an adjustment of the actuator 3 by a predetermined angle that is obtained from the transmission ratio of the gear unit 5.

The actuator drive 2 comprises an electronically commutated electric motor, in particular a three phase electric machine that is controlled by a driver circuit 6. The driver circuit 6 generates phase voltages for the actuator drive 2 in order to indicate to the actuator drive 2 a voltage vector (space vector) which at least in the stationary case leads to the rotor being positioned according to the predetermined space vector. The space vector leads to a stator magnetic field being formed parallel to the space vector. The exciter magnetic field, which is usually generated by rotor poles that are created in the rotor by means of permanent magnets, the direction of said rotor poles being varied as a result of the movement of the rotor, is aligned according to the direction of the stator magnetic field.

The voltage vector is defined by an amplitude (voltage magnitude) and a space vector direction. The space vector that is predetermined by the phase voltages is generated by a control unit 7 based on a position correcting variable L. It is possible for this purpose to implement in the driver circuit 6 a commutating method that provides the space vector by means of applying phase voltages according to a commutating pattern.

The control unit 7 is connected to a position detector 8 that is arranged in the proximity of the actuator 3 and provides position-related data S regarding the position of the actuator 3. The function of the position detector 8 can be based on optical, magnetic or similar measuring methods. The position detector 8 generally comprises a position measuring wheel, which is coupled to the actuator 3, and a sensor that detects a movement of the position measuring wheel and outputs a corresponding position change signal. The position change signal can then be converted in the position detector 8 into the position-related data S, for example by means of summation. Alternatively, the sensor can indicate the absolute position of the actuator 3 directly as position-related data S.

Based on the position-related data S regarding the position of the actuator 3, the control unit 7 performs a position control procedure that provides as a correcting variable the position correcting variable L that is communicated to the driver circuit 6. The position control procedure can be embodied according to a conventional position control procedure based on an externally predetermined desired position SS, and can comprise a proportional part and/or a differential part and/or an integral part. The position control procedure can ascertain a space vector as a correcting variable, wherein said space vector is converted into phase voltages in order thus to generate a correspondingly directed stator magnetic field. The rotor of the actuator drive 2 is aligned according to the direction of the magnetic field.

In an alternative embodiment, the position control procedure can however also change a prevailing space vector incrementally in amplitude and/or direction without the determination of a correcting variable that indicates an absolute position of the space vector. In this case, a position can be reverse calculated from the phase voltages that are applied by the driver circuit 6.

The following equations are produced for the motor torque when controlling the electronically commutated actuator drive 2:

$$U_d = RI_d - L_q I_q \omega_{el}$$

$$U_q = RI_q + L_d I_d \omega_{el} + K_m \omega_{el}$$

$$M = \frac{3}{2} N I_q [K_m + (L_d - L_q) I_d]$$

wherein $U_d$ and $U_q$ represent the voltages in the stator of the electronically commutated actuator drive 2 in the d- or q-direction of a rotor-fixed coordinate system, $I_d$ and $I_q$ represent the motor currents with respect to this coordinate system, $\omega_{el}$ represents the electric rotational speed of the rotor and M represents the torque. The parameters $L_d$ and $L_q$ that are assumed to be constant represent the inductances with regard to the rotor-fixed coordinate system. R represents the ohmic strand resistance of the stator winding and N indicates the number of pole pairs of the electronically commutated actuator drive 2. $K_m$ represents a motor constant that is generally ascertained in an empirical manner. The d-direction of the rotor-fixed coordinate system indicates the direction of the exciter magnetic field and the q-direction correspondingly indicates a direction that is at right angles to the d-direction of the rotor-fixed coordinate system.

The following equation applies when the actuator drive 2 is at a standstill and when using a non-salient pole machine:

$$\omega_{el} = 0 \text{ and } L_d = L_q.$$

Under these boundary conditions, the equations can be simplified to:

$$U_d = RI_d$$

$$U_q = RI_q$$

$$M = \frac{3}{2} N I_q K_m$$

During the position-controlling operation, a reduction in current in the d-direction and consequently also a reduction in voltage in the d-direction occur as a result of the commutating strategy in the case of a motor that is in a steady state and at a standstill:

$$I_d = 0 \text{ and } U_d = 0$$

and a voltage that is provided by the control procedure as a correcting variable in the q-direction that generates a motor torque that is sufficient merely to hold the throttle flap 3 at the prevailing position. This motor torque can be 0 Nm. In the case that the actuator drive 2 is coupled to a restoring spring (not illustrated), the motor torque corresponds to the spring torque that is generated by the spring force.

Figure 2:
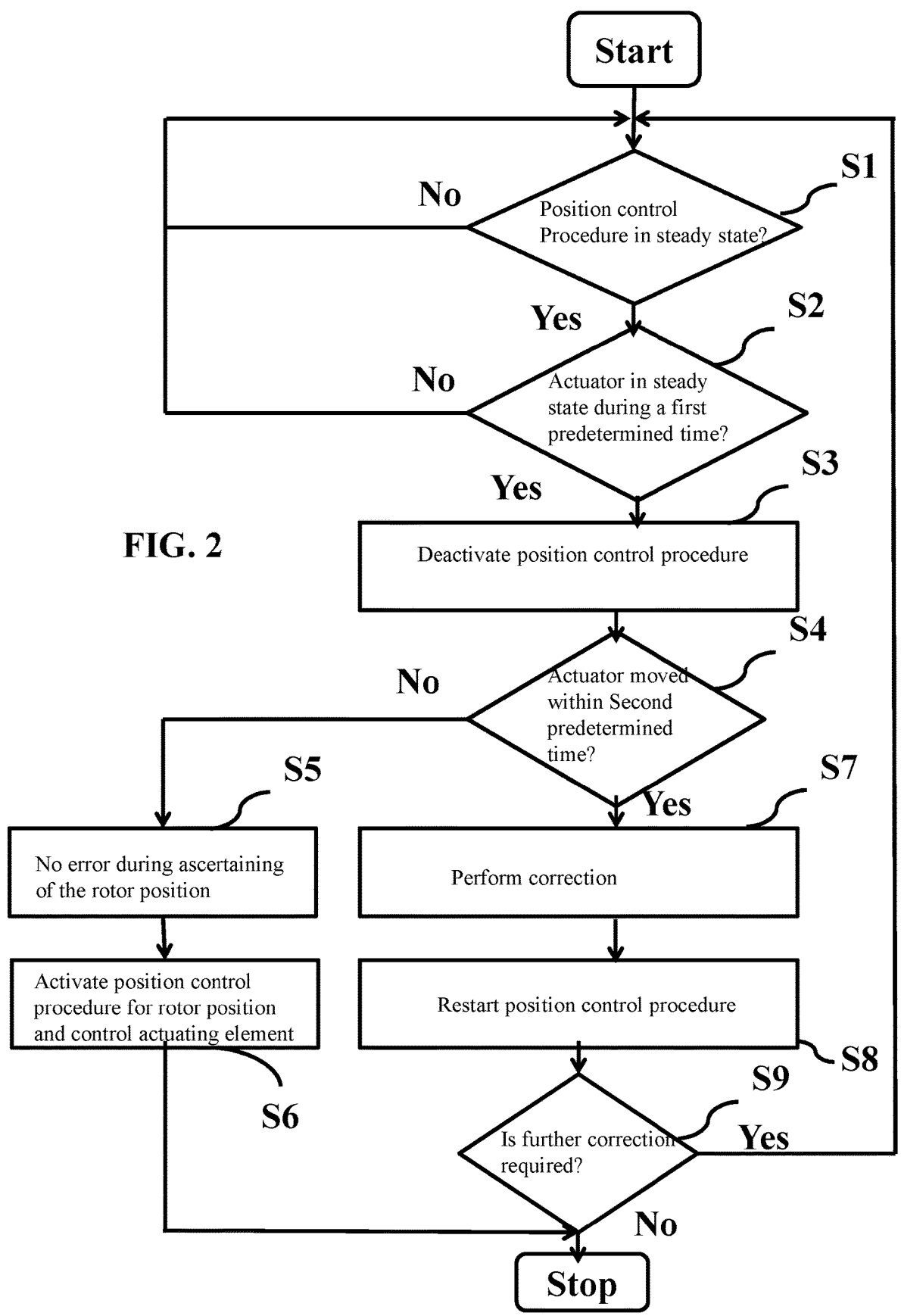
FIG. 2 is a flow chart for illustrating the method for detecting an error when ascertaining the position of a rotor.

FIG. 2 is a flow chart for illustrating the method for detecting an error of the assumed rotor position of the rotor of the actuator drive 2. A check is initially performed in step S1 as to whether the position control procedure, which is performed in the control unit 7, is in the steady state. This can be established with the aid of the position detector 8. As soon as the position detector 8 detects that the actuator 3 is at a standstill, in other words the position of the actuator 3 is not changing, the steady state condition is established. If it is established that a steady state condition is assumed (alternative: Yes), the method thus continues with step S2; otherwise (alternative: No) the method returns to step S1.

A check is performed in step S2 as to whether the actuator 3 also remains in the steady state condition during a predetermined time period of by way of example a few tenths of seconds up to several seconds. If this is the case (alternative: Yes), then the method continues with step S3, otherwise (alternative: No) the method is restarted with step S1 and once again waits for a steady state condition to prevail.

An active position control procedure is deactivated in step S3 and with regard to a rotor-fixed coordinate system that is based on an assumed rotor position (assumed coordinate system), the voltage $U_d$ in the d-direction is set to a specified voltage value $U_d^*$. If the assumed rotor position corresponds to the actual rotor position, the voltage in the d-direction was thus previously 0 volts. The algebraic sign of the specified voltage value $U_d^*$ in the d-direction can be selected as desired.

The prevailing voltage in the q-direction is held at a constant during this time period. The voltage in the q-direction is 0 V in systems that do not have a restoring force that acts on the actuator 3, whereas in the case of systems that have a restoring spring the voltage in the q-direction corresponds to a value that produces a torque of the rotor that counteracts the error torque that is the opposite thereto. If the assumed rotor position corresponds to the actual rotor position, then the torque that is produced by means of the actuator drive 2 is not changed significantly as a result of the influence of the voltage in the direction that has the specified voltage value $U_d^*$ but rather the current consumption is merely increased. Therefore, it is not expected that the actuator 3 will be influenced in the case of correct rotor position information.

A check is performed in step S4 as to whether a movement of the actuator 3 has occurred within a specific predetermined second time period since applying the specified voltage value $U_d^*$ in the d-direction (with regard to the assumed rotor position) and consequently a movement of the rotor has occurred.

If a movement of the actuator 3 has not occurred (alternative: No), an error has thus not occurred when ascertaining the rotor position, in other words the previously assumed rotor position corresponds to the actual rotor position or the error is so small that it merely produces a torque that is less than a static friction of the rotor. This can be indicated in step S5 in an appropriate manner.

It is subsequently possible in step S6 to activate the position control procedure for the rotor position and to control the actuating element 3 as usual.

However, if it is established in step S4 that, since or rather as a result of controlling the stator winding so that a voltage in the d-direction corresponds to the specified voltage value $U_d^*$, a movement of the actuating element 3 has occurred (alternative: Yes), a correction is thus performed in step S7. The correction is performed with the aid of a correction value that can be determined in dependence upon the algebraic sign of the error of the rotor position. The algebraic sign of the error of the rotor position is produced from the observed movement direction of the actuating element 3 and the algebraic sign of the specified voltage value $U_d^*$ in the d-direction. The correction value can be adjusted in an iterative manner (by a predetermined amount) by way of example by means of an incremention or decremention in dependence upon the algebraic sign of the error of the rotor position and the algebraic sign of the specified value of the voltage in the d-direction. In particular, the correction value can correspond to the rotor position offset value. In other words, the correction value can be added to or subtracted from the rotor position that is ascertained by the position detector 8 and the result can be used as the new assumed rotor position.

The iterative adjustment of the correction value prevents erroneous adjustments that are linked to the rate of movement or the gradient of the movement of the actuating element 3 as a result of the influences of the static friction. Furthermore, it is possible, for example in the systems that have a very low static friction, to provide as an alternative that the correction of the correction value in the case of small rotor position errors, in other words in the case of small movements of the rotor, is prevented as a result of applying the specified value of the voltage in the d-direction, since very small errors of the rotor position can be tolerated. The choice of the algebraic sign of the specified value is fundamentally arbitrary, the choice can however be performed in an alternating manner.

Owing to possible small movements of the actuator 3 as a result of external influences and also owing to possible signal noise in the position detector 8, a threshold value for a necessary change of the sensor signal of the position detector 8 should be used when detecting a movement of the actuator 3 and said threshold value is evaluated so as to detect a movement of the actuating element 3.

The position control procedure is subsequently restarted in step S8.

A check is performed in step S9 in accordance with an abort criterion as to whether a further correction is required. If it is established that a further correction is not required (alternative: No), then the method is terminated. Otherwise (alternative: Yes), the method jumps back to step S1 in order to repeat the previously described method.

Figure 3:
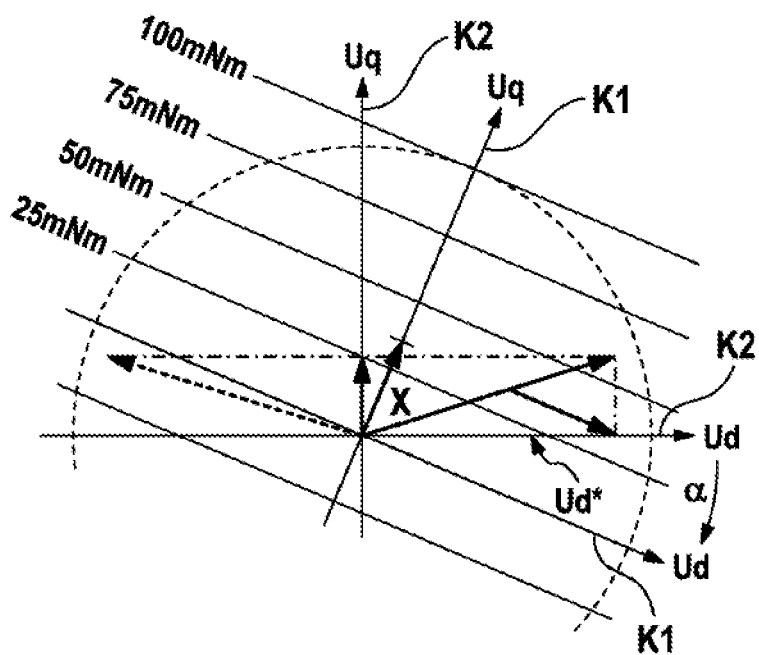
FIG. 3 is a diagram for illustrating voltage vectors in a rotor-fixed coordinate system in the event of an error occurring when ascertaining the position of a rotor.

The rotor-fixed coordinate system K1 is represented in FIG. 3 as an illustration for the actual rotor position and the rotor-fixed coordinate system for the assumed rotor position in the case of a recognition error a of the rotor position (angle). It is evident that a specified voltage value $U_d^*$ in the d-direction, said specified voltage value being applied with regard to the rotor-fixed coordinate system K2 of the assumed rotor position, leads to a part X of the voltage in the q-direction in the rotor-fixed coordinate system K1 of the actual rotor position, the magnitude of which is produced from the size of the recognition error a between the actual and assumed rotor position.

When deactivating the control procedure, it is necessary to use an integral part in order to stop the integrator 10 so that the controller unit statuses remain unchanged. A windup effect is eliminated in this manner.

It is furthermore possible to provide that the specified voltage value $U_d^*$ in the d-direction is applied in accordance with step S3 not in such a manner that it jumps but rather in accordance with a predetermined progression, in particular in accordance with a ramp-shaped progression. As a consequence, it is possible to avoid very intense movements as a result of high specified voltage values Ud* in the case of great deviations between the assumed and actual rotor position and in addition the current consumption of the positioning system 1 can be reduced since, as soon as a movement of the actuating element 3 is established, it is possible to stop the manipulation of the voltage in the d-direction.

A computer program is embodied so as to implement all the steps of the method as disclosed.

The computer program can be stored on an electronic storage medium 11.

The invention claimed is:

1. A method for operating an electronically commutated electric motor with a control unit, comprising:
    performing a position control procedure with the control unit to position an actuator drive of the electric motor in an assumed position, the actuator drive having a corresponding actual position and a position error, the position error being a difference between the assumed position and the actual position;
    providing data to the control unit based on the assumed position of the actuator drive;
    forming an electric space vector value to generate a component of a stator magnetic field that extends parallel with a direction of an exciter magnetic field that corresponds to the assumed position of the actuator drive;
    detecting whether a movement of the actuator drive has occurred as a result of generating the component of the exciter magnetic field, the movement corresponding to the position error;
    correcting the position control procedure based on the position error;
    operating the electronic motor according to the corrected position control procedure, such that a further assumed position of the actuator drive corresponds to the actual position of the actuator drive; and
    stopping an integrator part as the position control procedure is deactivated, the integrator part being included in the position control procedure.

2. The method as claimed in claim 1, further comprising:
    generating the component of the stator magnetic field in the case of a deactivated control procedure.

3. The method as claimed in claim 1, further comprising:
    correcting the assumed position of the actuator drive if the movement of the actuator drive is detected.

4. The method as claimed in claim 3, further comprising:
    correcting the assumed position of the actuator drive if the extent of a movement of the actuator drive exceeds a predetermined threshold value.

5. A method for detecting a position error of an electronically commutated actuator drive between an assumed position and an actual position of the actuator drive, the actuator drive operably connected to a movable actuator for controlling a position of the actuator, the method comprising:

operating the actuator drive by performing a position control procedure for controlling the position of the actuator with a control unit operably connected to the actuator drive;

directly detecting a controlled position of the actuator with a position detector operably connected to the actuator and spaced apart from the actuator drive;

indirectly determining an assumed position of the actuator drive based on only the detected controlled position of the actuator with the control unit;

determining an electric space vector value that generates a component of a stator magnetic field that extends parallel with a direction of an exciter magnetic field that prevails in the assumed position of the actuator drive; and detecting the position error when movement of the actuator occurs as a result of operating the actuator drive according to the determined electric space vector, as detected by the position detector.

6. The method as claimed in claim 5, wherein the actuator drive is a non-salient pole machine.

7. The method as claimed in claim 6, wherein in a rotor-fixed coordinate system, the actuator drive exhibits a q-direction inductance that is equal to a d-direction inductance.

8. The method as claimed in claim 5, further comprising:
imparting a first torque on the actuator in a first direction with a restoring force, and
imparting a second torque on the actuator in a second direction that is opposite the first direction during operation of the actuator drive by performance of the position control procedure.

9. The method as claimed in claim 8, wherein at the controlled position, the second torque equals the first torque.

10. The method as claimed in claim 5, further comprising:
indirectly positioning the actuator with a gear unit operably connected between the actuator drive and the actuator.

11. The method as claimed in claim 5, further comprising:
deactivating the position control procedure; and
determining the electric space vector value after the deactivating.

12. The method as claimed in claim 5, further comprising:
correcting the assumed position when the movement of the actuator occurs.

13. The method as claimed in claim 5, further comprising:
correcting the assumed position when an extent of a movement of the actuator exceeds a predetermined threshold value.

14. The method as claimed in claim 12, further comprising:
activating the position control procedure after the assumed position of the actuator drive has been corrected.

15. The method as claimed in claim 5, further comprising:
iteratively correcting the assumed position by incrementing or decrementing the assumed position and then determining a corresponding electric space vector value until no movement of the actuator occurs, as detected by the position detector.

16. The method as claimed in claim 5, wherein the method is performed in an iterative manner until no further movement of the actuator is detected by the position detector.

17. The method as claimed in claim 5, further comprising:
generating the component of the stator magnetic field in accordance with a predetermined ramp-shaped progression with respect to time.

18. The method as claimed in claim 6, further comprising:
stopping an integrator part when the position control procedure is deactivated,
wherein the integrator part is included in the position control procedure.

19. The method as claimed in claim 5, wherein the actuator drive is configured to rotate or to pivot the actuator.

20. The method as claimed in claim 19, wherein:
the actuator includes a restrictor flap located in an intake pipe, and
the detected controlled position of the actuator is an angle position of the restrictor flap within the intake pipe.

21. A positioning system, comprising:
an electronically commutated actuator drive;
a movable actuator coupled to the actuator drive, the actuator drive configured to control a position of the actuator;
a position detector configured to detect directly the controlled position of the actuator, the position detector operably connected to the actuator and spaced apart from the actuator drive; and
a control unit configured to detect a position error of the actuator drive between an assumed position and an actual position of the actuator drive, the control unit configured to
operate the actuator drive by performing a position control procedure for controlling the position of the actuator,
detect directly the controlled position of the actuator with the position detector,
determine indirectly the assumed position of the actuator drive based on only the detected controlled position of the actuator,
determine an electric space vector value that generates a component of a stator magnetic field that extends parallel with a direction of an exciter magnetic field that prevails in the assumed position of the actuator drive,
operate the actuator drive according to the determined electric space vector value, and
detect the position error when movement of the actuator occurs as a result of the determined electric space vector, as detected by the position detector.

22. The positioning system as claimed in claim 21, further comprising:
a gear unit operably connected to an output of the actuator drive and an input of the actuator,
wherein the position detector is connected directly to the actuator.

23. The positioning system as claimed in claim 21, wherein:
the actuator includes a restrictor flap located in an intake pipe, and
the detected controlled position of the actuator is an angle position of the restrictor flap within the intake pipe.

24. The positioning system as claimed in claim 21, further comprising:
a restoring element operably coupled to the actuator and configured to bias the actuator opposite a drive force of the actuator drive.

25. The positioning system as claimed in claim 22, wherein the gear unit is a reduction gear system having an input connected to the actuator drive and an output connected to the actuator.

26. The positioning system as claimed in claim 21, wherein the position detector comprises:
a position measuring wheel coupled to the actuator; and a sensor configured to detect a movement of the position measuring wheel.

\* \* \* \* \*